(12) United States Patent
Paulson

(10) Patent No.: US 8,104,346 B2
(45) Date of Patent: Jan. 31, 2012

(54) MEMS-BASED CAPACITIVE SENSOR

(75) Inventor: Hans Paulson, Horten (NO)

(73) Assignee: WesternGeco L.L.C., Houston, TX (US)

( * ) Notice: Subject to any disclaimer, the term of this patent is extended or adjusted under 35 U.S.C. 154(b) by 538 days.

(21) Appl. No.: 12/268,064

(22) Filed: Nov. 10, 2008

(65) Prior Publication Data

US 2010/0116054 A1    May 13, 2010

(51) Int. Cl.
*G01P 15/125* (2006.01)
(52) U.S. Cl. .................. 73/514.32; 73/514.18
(58) Field of Classification Search ............. 73/514.32, 73/514.36, 514.38, 514.29, 514.17, 514.18, 73/514.23, 514.24
See application file for complete search history.

(56) References Cited

U.S. PATENT DOCUMENTS

| | | | |
|---|---|---|---|
| 4,922,756 A | | 5/1990 | Henrion |
| 5,251,183 A | * | 10/1993 | McConnell et al. ............ 367/21 |
| 6,023,960 A | * | 2/2000 | Abrams et al. ................. 73/1.01 |
| 6,035,694 A | * | 3/2000 | Dupuie et al. ................. 73/1.38 |
| 6,497,149 B1 | * | 12/2002 | Moreau et al. ............ 73/514.32 |
| 6,805,008 B2 | | 10/2004 | Selvakumar et al. |
| 6,928,875 B2 | | 8/2005 | Bickford et al. |
| 6,943,697 B2 | * | 9/2005 | Ciglenec et al. ........... 340/853.1 |
| 6,945,110 B2 | | 9/2005 | Selvakumar et al. |
| 7,059,189 B2 | * | 6/2006 | Drabe et al. ............... 73/514.29 |
| 7,114,366 B1 | | 10/2006 | Jones et al. |
| 7,293,460 B2 | | 11/2007 | Zarabadi et al. |
| 7,337,671 B2 | | 3/2008 | Ayazi et al. |
| 2006/0021435 A1 | * | 2/2006 | Orsagh et al. ............. 73/514.34 |

OTHER PUBLICATIONS

Dong, et al, Force Feedback Linearization for Higher-Order Electromechanical Sigma-Delta Modulators, Journal of Micromechanics and Microengineering , 2006, pp. S54-S60, vol. 16.
PCT Search Report, dated May 31, 2010, Application No. PCT/US2009/063579.

\* cited by examiner

*Primary Examiner* — Helen C. Kwok

(57) ABSTRACT

An apparatus includes a seismic acquisition system that includes an accelerometer. The accelerometer includes a capacitive MEMS-based sensor, a controller and a charge amplifier. The sensor includes a proof mass; input terminals to receive a first signal; and an output terminal that is electrically connected to the proof mass to provide a second signal. The first signal, which is regulated by the controller, controls an equilibrium restoring force for the sensor and causes the sensor to provide the second signal. The charge amplifier provides a third signal, which is indicative of a position of the proof mass. The charge amplifier has an input terminal to continuously receive the second signal during a time in which the first signal controls the equilibrium restoring force and causes the sensor to provide the second signal.

32 Claims, 4 Drawing Sheets

MEMS-BASED CAPACITIVE SENSOR

BACKGROUND

The invention generally relates to a MEMS-based capacitive sensor for use in a seismic acquisition system.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

SUMMARY

In an embodiment of the invention, an apparatus includes a seismic acquisition system that includes an accelerometer. The accelerometer includes a capacitive MEMS-based sensor, a controller and a charge amplifier. The sensor includes a proof mass; input terminals to receive a first signal; and an output terminal that is electrically connected to the proof mass to provide a second signal. The first signal, which is regulated by the controller, controls an equilibrium restoring force for the sensor and causes the sensor to provide the second signal. The charge amplifier provides a third signal, which is indicative of a position of the proof mass. The charge amplifier has an input terminal to continuously receive the second signal during a time in which the first signal controls the equilibrium restoring force and causes the sensor to provide the second signal.

In another embodiment of the invention, a technique includes providing a seismic acquisition system that has an accelerometer. The accelerometer includes a capacitive MEMS-based sensor, which includes a proof mass; input terminals to receive a first signal; and an output terminal that is electrically connected to the proof mass to provide a second signal. The technique includes regulating an equilibrium restoring force for the sensor and energizing the sensor to cause the sensor to provide the second signal. The technique includes sensing the second signal in a continuous time interval during which the acts of regulating and energizing occur.

In yet another embodiment of the invention, an accelerometer includes a capacitive MEMS-based sensor, a controller and a charge amplifier. The sensor includes a proof mass; input terminals to receive a first signal; and an output terminal that is electrically connected to the proof mass to provide a second signal. The first signal, which is regulated by the controller, controls an equilibrium restoring force for the sensor and causes the sensor to provide the second signal. The charge amplifier provides a third signal, which is indicative of a position of the proof mass. The charge amplifier has an input terminal to continuously receive the second signal during a time in which the first signal controls the equilibrium restoring force and causes the sensor to provide the second signal.

Advantages and other features of the invention will become apparent from the following drawing, description and claims.

DETAILED DESCRIPTION

Figure 1:
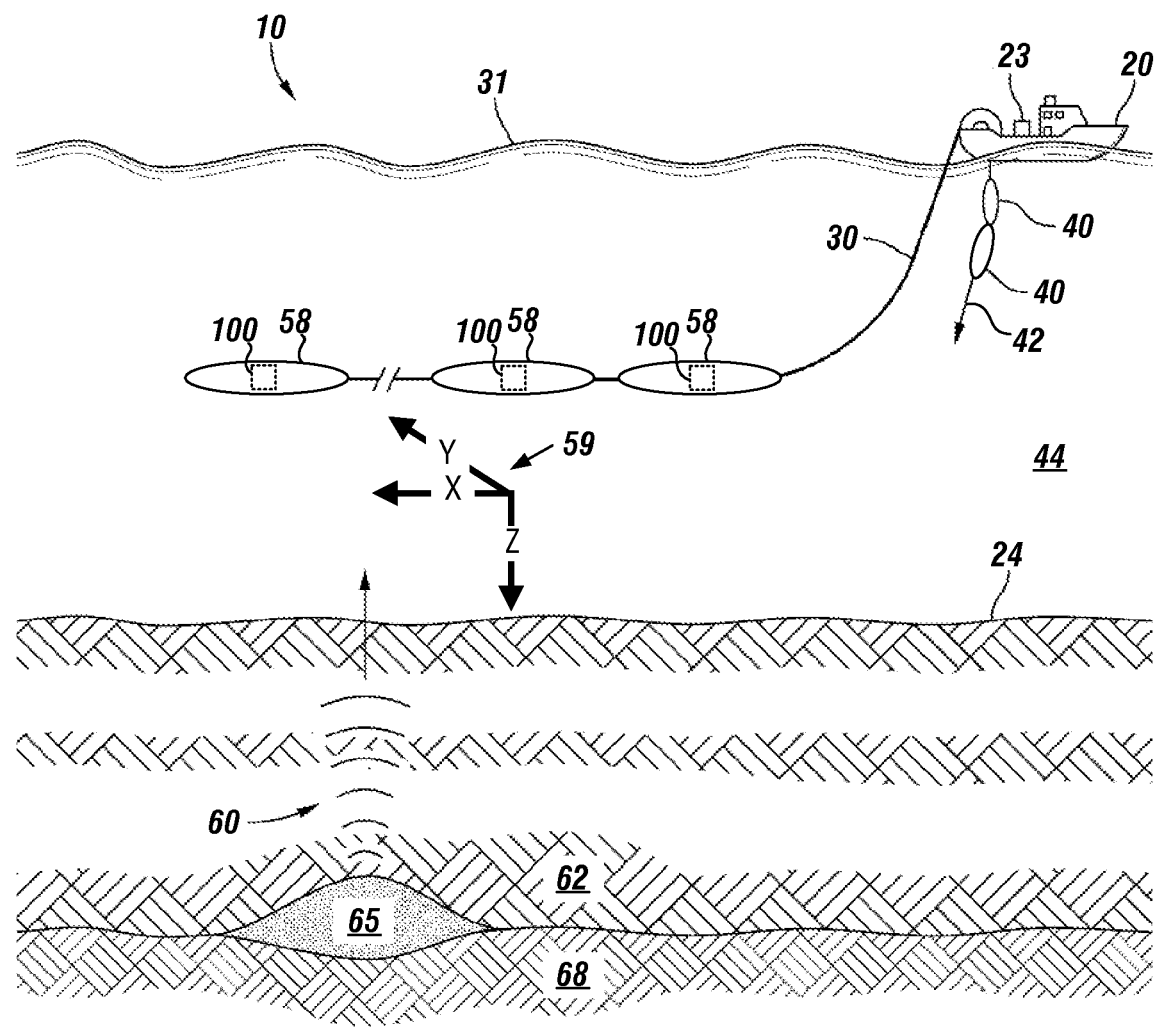
FIG. 1 is a schematic diagram of a marine seismic acquisition system according to an embodiment of the invention.

FIG. 1 depicts an embodiment 10 of a marine-based seismic data acquisition system in accordance with some embodiments of the invention. In the system 10, a survey vessel 20 tows one or more seismic streamers 30 (one exemplary streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. In accordance with embodiments of the invention, the streamers 30 contain seismic sensor units 58, each of which contains a multi-component sensor. The multi-component sensor includes a hydrophone and particle motion sensors, in accordance with some embodiments of the invention. Thus, each sensor unit 58 is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component sensor may include one or more hydrophones, geophones, particle displacement sensors, particle velocity sensors, accelerometers, pressure gradient sensors, or combinations thereof.

As a more specific example, in accordance with some embodiments of the invention, a particular multi-component sensor may include a hydrophone for measuring pressure and three orthogonally-aligned accelerometers to measure three corresponding orthogonal components of particle velocity and/or acceleration near the sensor. It is noted that the multi-component sensor may be implemented as a single device (as depicted in FIG. 1) or may be implemented as a plurality of devices, depending on the particular embodiment of the invention. A particular multi-component sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

In accordance with embodiments of the invention described herein, the multi-component sensor includes at least one capacitive microelectromechanical system (MEMS)-based accelerometer 100, which is advantageous due to its size, low power dissipation and low cost. For purposes of simplifying the following discussion, embodiments are described below in which the accelerometer 100 senses acceleration along a single sensitive axis. However, these embodiments are for purposes of example, as the accelerometer 100 may sense acceleration along two or three orthogonal sensitive axes, in accordance with other embodiments of the invention.

The marine seismic data acquisition system 10 includes seismic sources 40 (two exemplary seismic sources 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the sources 40 produce corresponding reflected acoustic signals, or pressure waves 60, which are sensed by the seismic sensors of the streamer(s) 30. It is noted that the pressure waves that are received and sensed by the seismic sensors include "up going" pressure waves that propagate to the sensors without reflection, as well as "down going" pressure waves that are produced by reflections of the pressure waves 60 from an air-water boundary, or free surface 31.

The seismic sensors of the streamer(s) 30 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular multi-component sensor may provide a trace, which corresponds to a measure of a pressure wavefield by its hydrophone; and the sensor may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system that may be, for example, located on land or on the vessel 20. Thus, many variations are possible and are within the scope of the appended claims.

Figure 2:
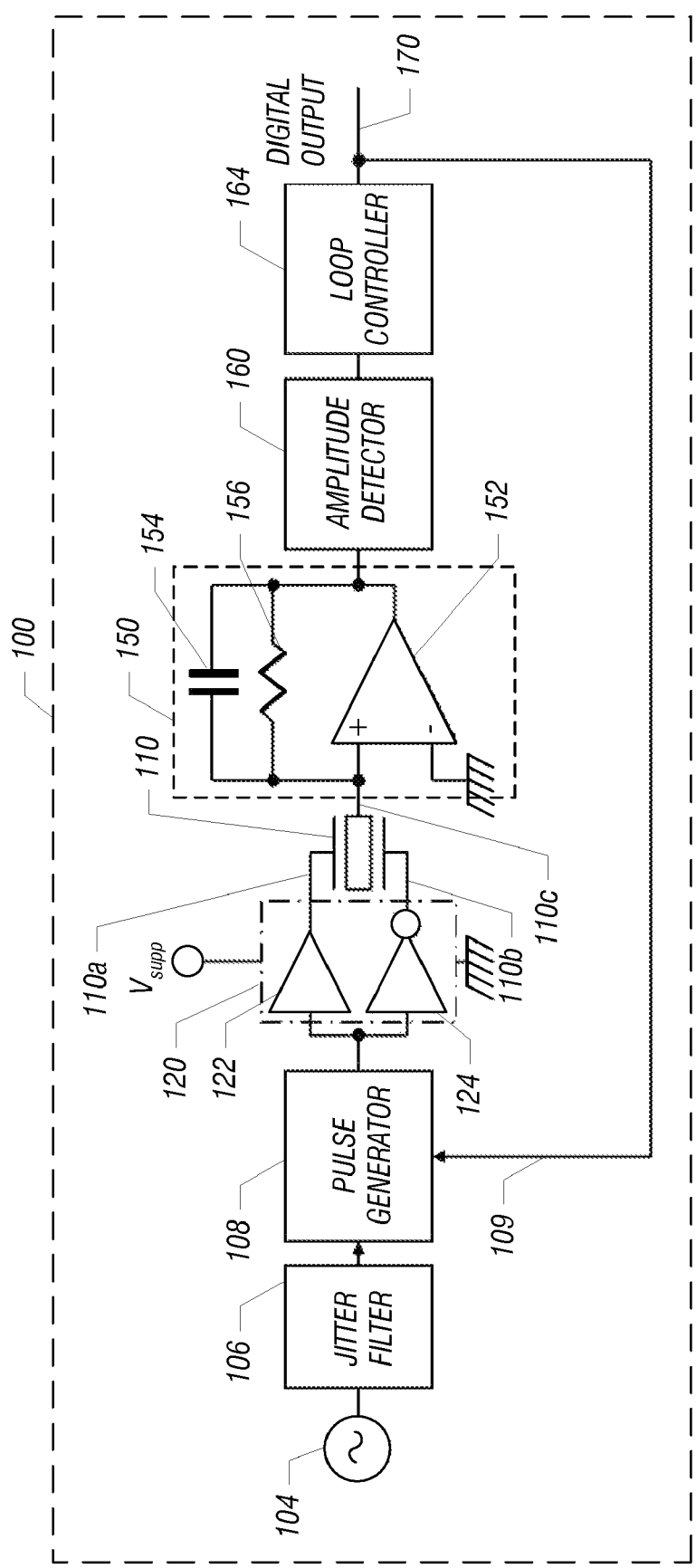
FIGS. 2 and 6 are schematic diagrams of accelerometers according to embodiments of the invention.

Referring to FIG. 2, in accordance with some embodiments of the invention, the accelerometer 100 includes a capacitive MEMS-based sensor 110. The sensor 110 includes an armature and a pair of fixed position electrodes 110a and 110b (called "fixed electrodes" herein), which are rigidly attached to the armature. The sensor 110 also includes at least one mobile electrode 110c, which is mounted on a moving proof mass that is suspended between the two fixed electrodes 110a and 110b by springs that are also connected to the armature. This structure forms a differential capacitor, in which the mobile electrode 110c moves along a sensitive axis in response to an external acceleration.

The differential capacitor is formed from two capacitors: a first capacitor is formed between the electrodes 110a and 110c; and another capacitor (in series with the other capacitor) is formed between the electrodes 110c and 110b. Movement of the mobile electrode 110c increases the capacitance of one of these two capacitors and conversely decreases the capacitance of the other capacitor, depending on the particular direction of the movement. The differential capacitance may be sensed for purposes of determining the direction and degree of sensed acceleration.

For purposes of allowing the differential capacitance of the sensor 110 to be sensed, the sensor 110 is activated by applying a voltage across the fixed electrodes 110a and 110b. As described further below, this voltage also produces an actuation force, which tends to restore the proof mass to its equilibrium position.

More specifically, when subjected to inertial forces caused by an external acceleration, the proof mass is kept in the equilibrium position by electrostatic forces controlled by the feedback system. An amplitude detector 160 and the loop controller 164 of the accelerometer have a very high gain, and the residual movement of the mobile mass with respect to its equilibrium position is therefore kept close to zero. The magnitude and direction of the net restoring force is given as the difference between two attractive forces working in opposite directions. For example, if the external acceleration force tends to move the mobile electrode closer to fixed electrode 110b, the loop controller 164 will increase the electrostatic force between the mobile electrode and the fixed electrode 110a and, simultaneously, decrease the electrostatic force between the mobile electrode and the fixed electrode 110b. The complementary actuation voltages are switched between zero voltage and the full supply voltage at a high repetition frequency, and the effective actuation force is governed by the duty-cycle of the pulse sequence.

In conventional capacitive MEMS-based sensors, activation and actuation voltages are applied to the fixed position electrodes in different clock phases, and switches control when the differential capacitance of the sensor is sensed. In this regard, in a conventional MEMS-based sensor, a charge amplifier may be connected via one or more switches to the MEMS-based sensor during a sensing clock phase when the activation voltage is applied; and the switch(es) are then opened to isolate the charge amplifier from the sensor when the actuation voltage is applied to the electrodes. A difficulty with this arrangement, however, is that sampling noise (i.e., the "kT/C" noise), which is introduced by the switching, typically degrades the dynamic range of the sensor.

In accordance with embodiments of the invention, which are described herein, the accelerometer 100 includes a charge amplifier 150, which has an input terminal that is continuously connected to the mobile electrode 110c of the sensor 110 and thus, is not connected to the mobile electrode via a switch controlled path. In other words, the input terminal of the charge amplifier 150 is continuously connected to the mobile electrode 110c during times in which the sensor 110 receives both actuation and activation voltages. Thus, the sampling noise is eliminated (as compared to conventional arrangements), which improves the accelerometer's dynamic range.

Figure 3:
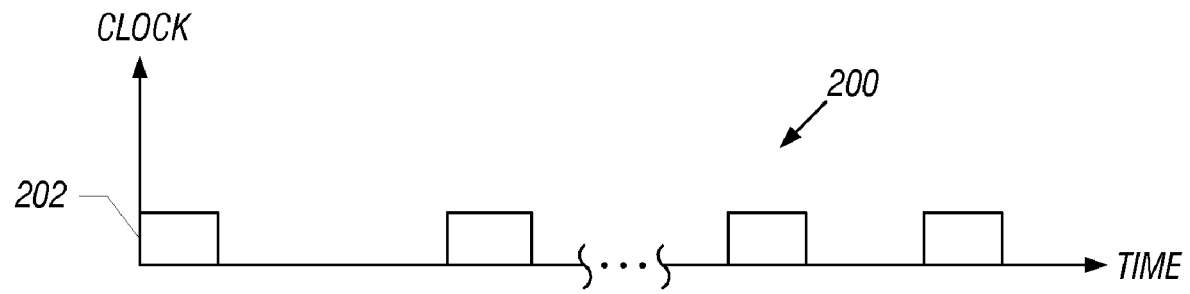
FIGS. 3, 4 and 5 are waveforms of signals of the accelerometer according to an embodiment of the invention.
Figure 5:
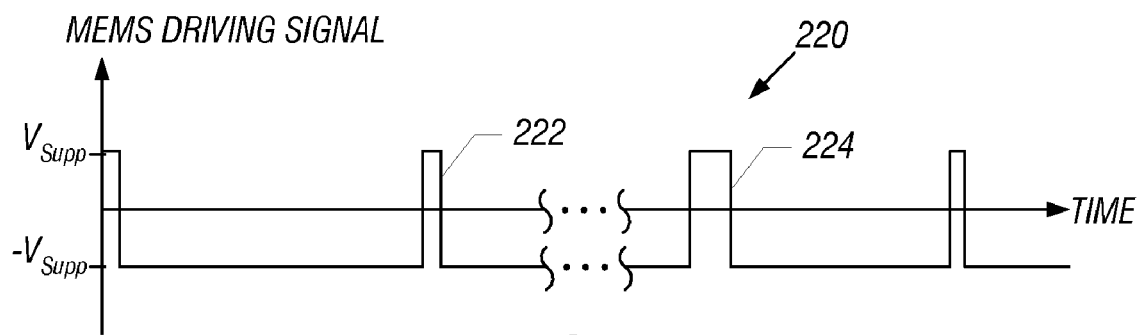

As a more specific example, in accordance with embodiments of the invention, both the activation and actuation of the sensor 110 are regulated through a driving signal 220, which is depicted in FIG. 5. Referring to FIG. 2 (for the structure of the accelerometer 100), a complimentary logic driver 120 of the accelerometer 100 receives a pulse train signal 210 from a pulse generator 108 of the accelerometer 100. In response to the pulse train signal 210, the driver 120 generates the driving signal 220, which is applied across the fixed electrodes 110a and 110b of the sensor 110. For this specific example, the logic 120 is coupled to a positive power supply rail voltage (called "$V_{SUPP}$") and ground (which is the negative power supply rail for this non-limiting example). The generation of the pulse train signal 210 by the pulse generator 108 is synchronized to a clock signal 200 (see FIG. 3), which is generated by a system clock generator 104. In response to the pulse train signal 210, complimentary drivers 112 and 124 of the driver 120 generate the driving signal 200.

The application of the driving signal 220 has two effects on the sensor 110: the driving signal 220 produces an electrostatic moment, which causes the mobile electrode 110c to produce a signal that is sensed by the charge amplifier 150 and is indicative of the position of the proof mass; and the average, or DC, value of the driving signal 220 establishes the equilibrium restoring, actuation force on the sensor 110.

The amplitude detector 160 detects the output signal from the charge amplifier 150 for purposes of sensing the residual movement of the proof mass. As further described below, the output signal of the charge amplifier 150 is also modulated, or influenced, by the driving signal 220. The amplitude detector 160 senses the amplitude of the signal produced by the charge amplifier 150 and provides this sampled peak value to the loop controller 164.

In accordance with embodiments of the invention described herein, the loop controller 164 performs an analog-to-digital (A/D) conversion of the peak signal that is provided by the amplitude detector 160 and applies a loop transfer function for purposes of producing a digital output signal 170, which is indicative of the magnitude and direction of the sensed acceleration along the sensitive axis of the sensor 110. As a more specific example, in accordance with some embodiments of the invention, the loop controller 164 may be a sigma delta modulator, which provides a single bit output stream as the digital output signal 170. Thus, the digital output signal 170 may be a time sequence of "1s" and "0s," which indicate the magnitude and direction of sensed acceleration. As a non-limiting example, a string of zeros may indicate maximum acceleration in a particular direction and a string of ones may indicate maximum acceleration in the other direction. It is noted that in accordance with other embodiments of the invention, the digital output signal 170 may be a multiple bit digital signal. In yet other embodiments of the invention, the accelerometer 100 may furnish an analog output signal.

Figure 4:
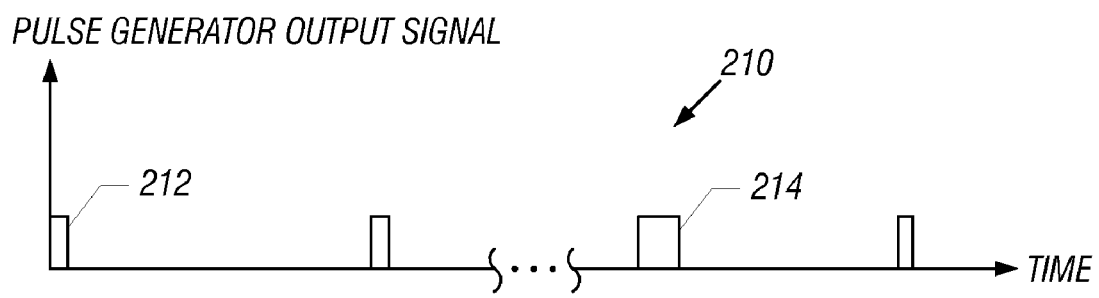

The pulse generator 108 generates the pulse train signal 210 (see FIG. 4) in response to the digital output signal 170. As a more specific non-limiting example, in accordance with some embodiments of the invention, the pulse generator 108 selectively generates two pulse widths to control the pulse density of the driving signal 220 (see FIG. 5), based on the digital output signal 170. For example, the pulse generator 108 may generate a relatively narrow pulse 212 (see FIG. 4) in response to a digital bit of "zero" and generate a relatively wider pulse 214 in response to a digital bit of "1." The pulse density of the pulse train signal 210 controls the average, or DC, value of the driving signal 220, which, in turn, controls the magnitude and direction of the equilibrium, restoring actuation force that is applied to the sensor 110.

Because the actuation and activation of the sensor 110 occur during the same clock phase, the single MEMS-based sensor 110 functions both as an actuator and a sensor within the same clock phase. In accordance with some embodiments of the invention, the amplitude detector 160 double samples the charge amplifier's output signal for purposes of separating these components.

As a more specific example, in accordance with some embodiments of the invention, in response to the positive, or upgoing, edge (edge 202 in FIG. 3, for example) of the clock signal, the amplitude detector 160 samples the charge amplifier's output signal to derive a baseline signal containing noise due to thermal noise, pulse parameters, etc.; and at a later time during the clock phase, the amplitude detector 160 resamples the charge amplifier's output signal near its peak. Therefore, by subtracting the first sampled value from the latter sampled value, a resulting signal is derived that indicates the sensed charge and is generally devoid of the noise present in the baseline signal.

Among its other features, in accordance with some embodiments of the invention, the accelerometer 100 may include a jitter filter 106 that is located between the system clock generator 104 and the clock input terminal of the pulse generator 104. Clock jitter, in general, modulates the effective force that is applied by the feedback pulses and may therefore be a dominant cause of noise in the actuator function. In accordance with some embodiments of the invention, the jitter filter 106 is a phase locked loop (PLL), which filters out jitter from the system's reference clock; and thus, the clocking system does not use a crystal resonator, thereby facilitating a simpler and more economic system integration.

In accordance with some embodiments of the invention, the charge amplifier 150 includes a main, relatively high gain amplifier 152, which has its noninverting input terminal that is coupled to system ground (for embodiments of the invention in which the negative voltage supply is ground). The inverting input terminal of the charge amplifier 152 is coupled to the mobile electrode 110c of the sensor 110. Because the voltage across the input terminals of the amplifier 152 is essentially zero, the input terminal that is coupled to the mobile electrode 110c is essentially coupled to a system supply rail voltage (in this case, ground). This arrangement, in turn, maximizes the available equilibrium actuation force for a given supply voltage.

In accordance with embodiments of the invention, a feedback network, formed from the parallel combination of a capacitor 154 and a resistor 156, is coupled between the inverting input and output terminals of the amplifier 152. It is noted that the topology shown in FIG. 2 is essentially establishes a constant voltage drive for the sensor 110, in that the supply voltage that is used to generate the pulses remains constant. Due to this topology, however, the residual movement of the proof mass modulates the capacitor gaps at the electrodes 110a and 110b, and therefore, the actuation force is dependent on the movement of the proof mass.

Figure 6:
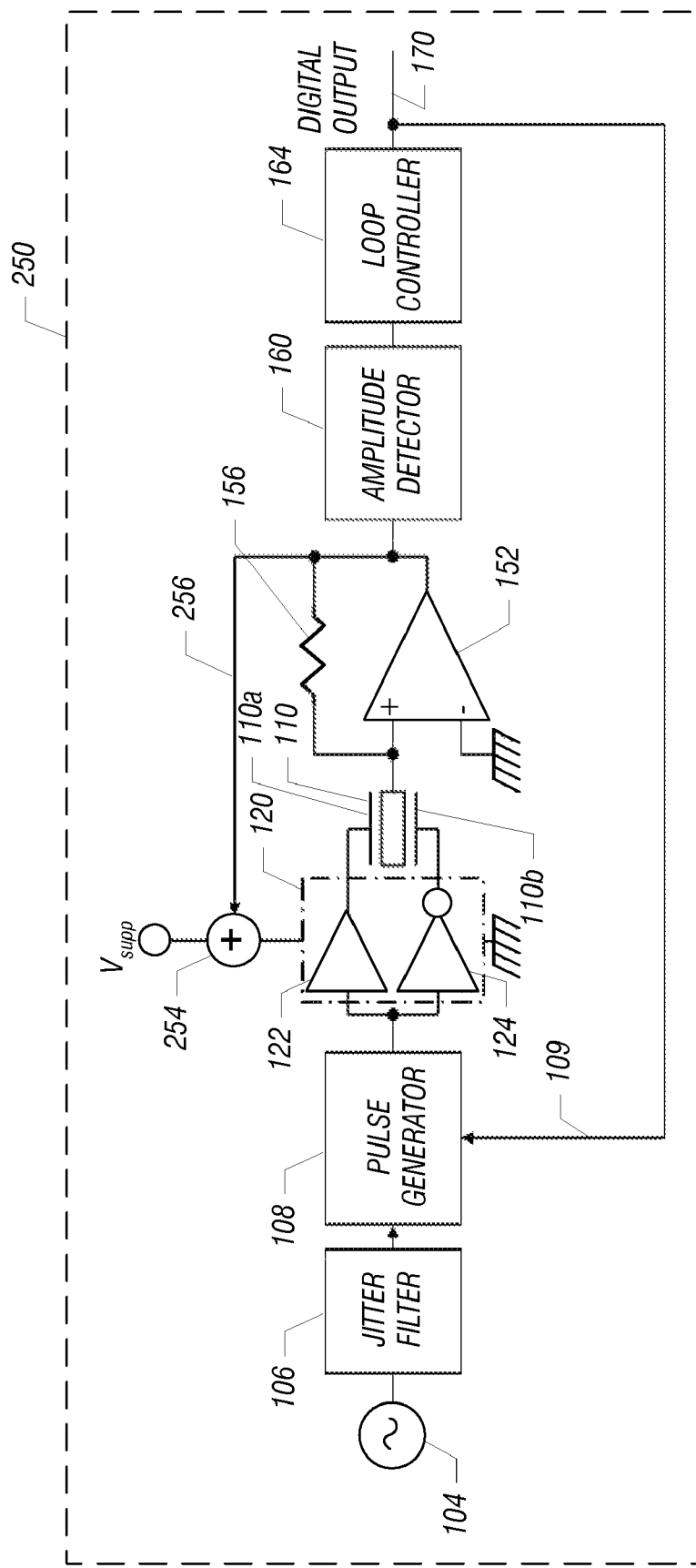

Therefore, referring to FIG. 6, in accordance with other embodiments of the invention, an accelerometer 250 may be used in place of the accelerometer 100. In general, similar reference numerals have been used in FIG. 6 to denote components that the accelerometers 100 and 250 share in common. Unlike the accelerometer 100, the accelerometer 250 employs a constant charge drive for the sensor 110. More specifically, the charge amplifier of the accelerometer 250 modulates, or adjusts, the actuation voltage based on the proof mass movement, thereby increasing the available signal-to-noise ratio.

More specifically, in accordance with embodiments of the invention, the charge amplifier of the accelerometer 200 does not include the feedback capacitor 154 (as depicted in FIG. 2). Instead, the MEMS capacitor is incorporated into the feedback network of the charge amplifier. The output terminal of the amplifier 152 is connected to an adder 254 that combines the output signal from the amplifier 152 with the supply voltage $V_{SUPP}$. Due to this arrangement, the supply voltage that is applied to the logic 120 is modulated, according to the sensed signal that is provided at the output terminal of the amplifier 152; and as a result, the actuation force is independent of the proof mass movement.

Many variations are contemplated and are within the scope of the appended claims. For example, in accordance with some embodiments of the invention, the jitter filter 106, pulse generator 108, logic 120, charge amplifier, amplitude detector 160, sensor 110 and loop controller 164 may be integrated in a single monolithic die; may be integrated in a separate dies in a single semiconductor package; may be part of separate semiconductor packages; etc.

As other examples, in other embodiments of the invention, the accelerometer 100, 250 may be part of a seismic sensor cable other than a streamer. As non-limiting examples, the accelerometer 100 may be a land-based seismic sensor cable or a seabed-based seismic sensor cable. As other variations, the accelerometers 100, 250 may be part of a sensor module that is not part of a sensor cable. In this regard, in some embodiments of the invention, the accelerometers 100, 250 may be part of a seismic acquisition system that is formed from sensor modules that are connected by wired connections, such as cables. In other embodiments of the invention, the sensor modules may be interconnected through wireless connections. Thus, many variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. An apparatus comprising:
   a seismic acquisition system, comprising an accelerometer,
   wherein the accelerometer comprises:
     a capacitive MEMS-based sensor comprising a proof mass, input terminals to receive a first signal and an output terminal electrically connected to the proof mass to provide a second signal indicative of an acceleration sensed by the sensor, wherein the first signal controls an equilibrium restoring force for the sensor and causes the sensor to provide the second signal; and
     a charge amplifier to provide a third signal indicative of a position of the proof mass, the charge amplifier having an input terminal to receive the second signal during a continuous time interval that includes a first time subinterval in which the first signal controls the equilibrium restoring force and a second time subinterval in which the sensor provides the second signal.

2. The apparatus of claim 1, wherein the accelerometer further comprises:
   an amplitude detector to receive the third signal and generate a fourth signal indicative of an amplitude of the third signal.

3. The apparatus of claim 2, wherein the amplitude detector is adapted to double sample the third signal to separate a first component of the third signal indicative of the position of the proof mass from a second component of the third signal indicative of the first signal.

4. The apparatus of claim 2, further comprising a controller to perform an analog-to-digital conversion of the third signal.

5. The apparatus of claim 4, wherein the controller comprises a sigma delta modulator.

6. The apparatus of claim 1, wherein the charge amplifier has an input bias voltage connected to a supply voltage rail of the accelerometer.

7. The apparatus of claim 1, wherein the charge amplifier comprises a feedback capacitor that is part of the sensor.

8. The apparatus of claim 1, further comprising:
   a circuit to adjust a magnitude of the first signal based on the third signal to cause the equilibrium restoring force to be substantially independent of movement of the proof mass.

9. The apparatus of claim 1, further comprising:
   a controller to provide a third signal indicative of the acceleration;
   a complementary driver to provide the first signal in response to a pulse train signal; and
   a pulse generator to provide the pulse train signal based on the third signal.

10. The apparatus of claim 9, further comprising:
    a clock generator to synchronize cycles of the pulse train signal,
    wherein the first signal both controls an equilibrium restoring force for the sensor and causes the sensor to provide the second signal during each cycle of the clock signal.

11. The apparatus of claim 10, further comprising:
    a jitter filter electrically coupled between the clock generator and the pulse generator.

12. The apparatus of claim 1, wherein the seismic acquisition system comprises sensor modules that are connected by wireless or wired connections.

13. The apparatus of claim 1, wherein the seismic acquisition system comprises a streamer, a land-based sensor cable or a seabed-based sensor cable.

14. The apparatus of claim 1, wherein the seismic acquisition system comprises a streamer, the system further comprising:
    a survey vessel to tow the streamer.

15. A method comprising:
    providing a seismic acquisition system having an accelerometer, the accelerometer comprising a capacitive MEMS-based sensor comprising a proof mass, input terminals to receive a first signal and an output terminal electrical connected to the proof mass to provide a second signal;
    regulating an equilibrium restoring force for the sensor;
    energizing the sensor to cause the sensor to provide the second signal; and
    sensing the second signal in a continuous time interval during which the acts of regulating and energizing occur.

16. The method of claim 15, wherein the sensing occurs continuously connecting an input terminal of a charge amplifier for the duration of the time interval.

17. The method of claim 16, further comprising:
doubling sampling to separate a first component of signal information provided by the charge amplifier indicative of a position of the proof mass from a second component of the signal information indicative of a signal used to energize the sensor.

18. The method of claim 16, further comprising:
using a capacitor of the sensor in a feedback path for the charge amplifier.

19. The method of claim 16, further comprising:
adjusting a signal applied to energize the sensor based on an output signal provided by the charge amplifier to cause the equilibrium restoring force to be substantially independent of movement of the proof mass.

20. The method of claim 15, wherein the seismic acquisition system comprises sensor modules that are connected by wireless or wired connections.

21. The method of claim 15, wherein the seismic acquisition system comprises a streamer, a land-based sensor cable or a seabed-based sensor cable.

22. The method of claim 21, further comprising:
towing the streamer with a survey vessel.

23. An accelerometer comprising:
a capacitive MEMS-based sensor comprising a proof mass, input terminals to receive a first signal and an output terminal electrical connected to the proof mass to provide a second signal indicative of an acceleration sensed by the sensor, wherein the first signal controls an equilibrium restoring force for the sensor and causes the sensor to provide the second signal; and
a charge amplifier to provide a third signal indicative of a position of the proof mass, the charge amplifier having an input terminal to receive the second signal during a continuous time interval that includes a first time subinterval in which the first signal controls the equilibrium restoring force and a second time subinterval in which the sensor provides the second signal.

24. The accelerometer of claim 23, wherein the accelerometer further comprises:
an amplitude detector to receive the third signal and generate a fourth signal indicative of an amplitude of the third signal.

25. The accelerometer of claim 24, wherein the amplitude detector is adapted to double sample the third signal to separate a first component of the third signal indicative of the position of the proof mass from a second component of the third signal indicative of the first signal.

26. The accelerometer of claim 23, further comprising a controller to perform an analog-to-digital conversion of the third signal.

27. The accelerometer of claim 26, wherein the controller comprises a sigma delta modulator.

28. An accelerometer comprising:
a capacitive MEMS-based sensor comprising a proof mass, input terminals to receive a first signal and an output terminal electrical connected to the proof mass to provide a second signal indicative of an acceleration sensed by the sensor, wherein the first signal controls an equilibrium restoring force for the sensor and causes the sensor to provide the second signal;
a charge amplifier to provide a third signal indicative of a position of the proof mass, the charge amplifier having an input terminal; and
a non-switched path to communicate the second signal from the sensor to the input terminal of the charge amplifier.

29. The accelerometer of claim 28, wherein the accelerometer further comprises:
an amplitude detector to receive the third signal and generate a fourth signal indicative of an amplitude of the third signal.

30. The accelerometer of claim 29, wherein the amplitude detector is adapted to double sample the third signal to separate a first component of the third signal indicative of the position of the proof mass from a second component of the third signal indicative of the first signal.

31. The accelerometer of claim 28, further comprising a controller to perform an analog-to-digital conversion of the third signal.

32. The accelerometer of claim 31, wherein the controller comprises a sigma delta modulator.

* * * * *